US010462969B2

(12) United States Patent
Benes et al.

(10) Patent No.: US 10,462,969 B2
(45) Date of Patent: Nov. 5, 2019

(54) ATTACHMENT FOR HARVESTING ROW CROPS

(71) Applicant: CLAAS Omaha Inc., Omaha, NE (US)

(72) Inventors: Jason Benes, Omaha, NE (US); Brian Aschbrenner, Omaha, NE (US)

(73) Assignee: CLAAS Omaha Inc., Omaha, NE (US)

( * ) Notice: Subject to any disclaimer, the term of this patent is extended or adjusted under 35 U.S.C. 154(b) by 154 days.

(21) Appl. No.: 15/671,745

(22) Filed: Aug. 8, 2017

(65) Prior Publication Data
US 2019/0045710 A1 Feb. 14, 2019

(51) Int. Cl.
| A01D 45/02 | (2006.01) |
| A01D 43/08 | (2006.01) |
| A01D 41/14 | (2006.01) |
| A01D 57/22 | (2006.01) |
| A01D 91/04 | (2006.01) |
| A01D 63/04 | (2006.01) |
| A01D 75/02 | (2006.01) |

(52) U.S. Cl.
CPC .............. *A01D 45/02* (2013.01); *A01D 41/14* (2013.01); *A01D 43/081* (2013.01); *A01D 57/22* (2013.01); *A01D 63/04* (2013.01); *A01D 91/04* (2013.01); *A01D 45/021* (2013.01); *A01D 75/02* (2013.01)

(58) Field of Classification Search
CPC .... A01D 45/02; A01D 45/021; A01D 43/082; A01D 63/04; A01D 65/00; A01D 41/14; A01D 43/081; A01D 57/22; A01D 91/04; A01D 63/02; A01D 75/02
USPC ...................................... 56/66, 98, 118, 119
See application file for complete search history.

(56) References Cited

U.S. PATENT DOCUMENTS

| 4,446,682 | A | * | 5/1984 | Jennen | A01D 45/021 56/119 |
| 4,493,181 | A | * | 1/1985 | Glendenning | A01D 65/00 56/119 |
| 4,553,379 | A | * | 11/1985 | Kalverkamp | A01D 45/021 56/106 |
| 5,195,309 | A | | 3/1993 | Mossman | |
| 5,444,968 | A | * | 8/1995 | Barton | A01D 45/021 56/119 |
| 5,775,076 | A | | 7/1998 | Mossman | |

(Continued)

FOREIGN PATENT DOCUMENTS

DE 10317469 A1 11/2004

OTHER PUBLICATIONS

European Search Report dated Dec. 14, 2018 for European Application No. 18169147.8.

*Primary Examiner* — Robert E Pezzuto
(74) *Attorney, Agent, or Firm* — Lempia Summerfield Katz LLC

(57) ABSTRACT

An outer stalk divider for an attachment for harvesting row crop, in particular for a corn picker or corn header, includes a base body that extends in a traveling direction and a surface that extends in the traveling direction on an upper side, a hood, which is situated at the front on the base body as viewed in the traveling direction, and tapers in the traveling direction, and a cover element which, in the traveling direction, is situated behind the hood and on the upper side. The cover element extends at least partially along the surface of the base body, and is at least partially arched in design on an outer surface facing away from the surface. The cover element may be adjustable relative to the base body.

20 Claims, 8 Drawing Sheets

(56) References Cited

U.S. PATENT DOCUMENTS

| | | | |
|---|---|---|---|
| 5,865,019 A * | 2/1999 | Hurlburt | A01D 45/021 56/118 |
| 6,625,969 B2 * | 9/2003 | Glazik | A01D 63/04 56/119 |
| 7,043,891 B2 | 5/2006 | Rickert et al. | |
| 8,567,168 B2 | 10/2013 | Allochis | |
| 2005/0126151 A1 | 6/2005 | Buresch | |
| 2014/0150394 A1 | 6/2014 | Calmer | |

* cited by examiner

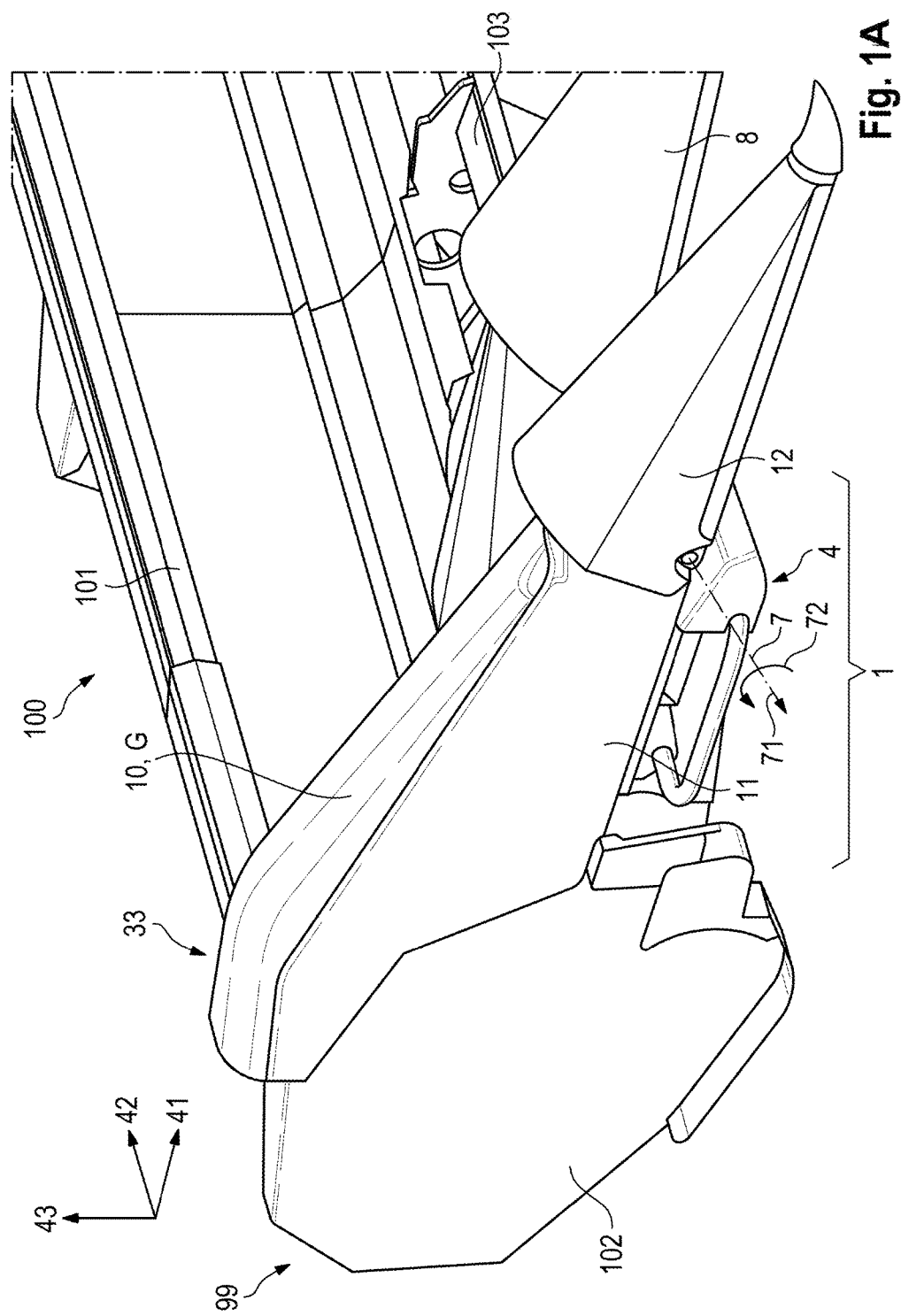

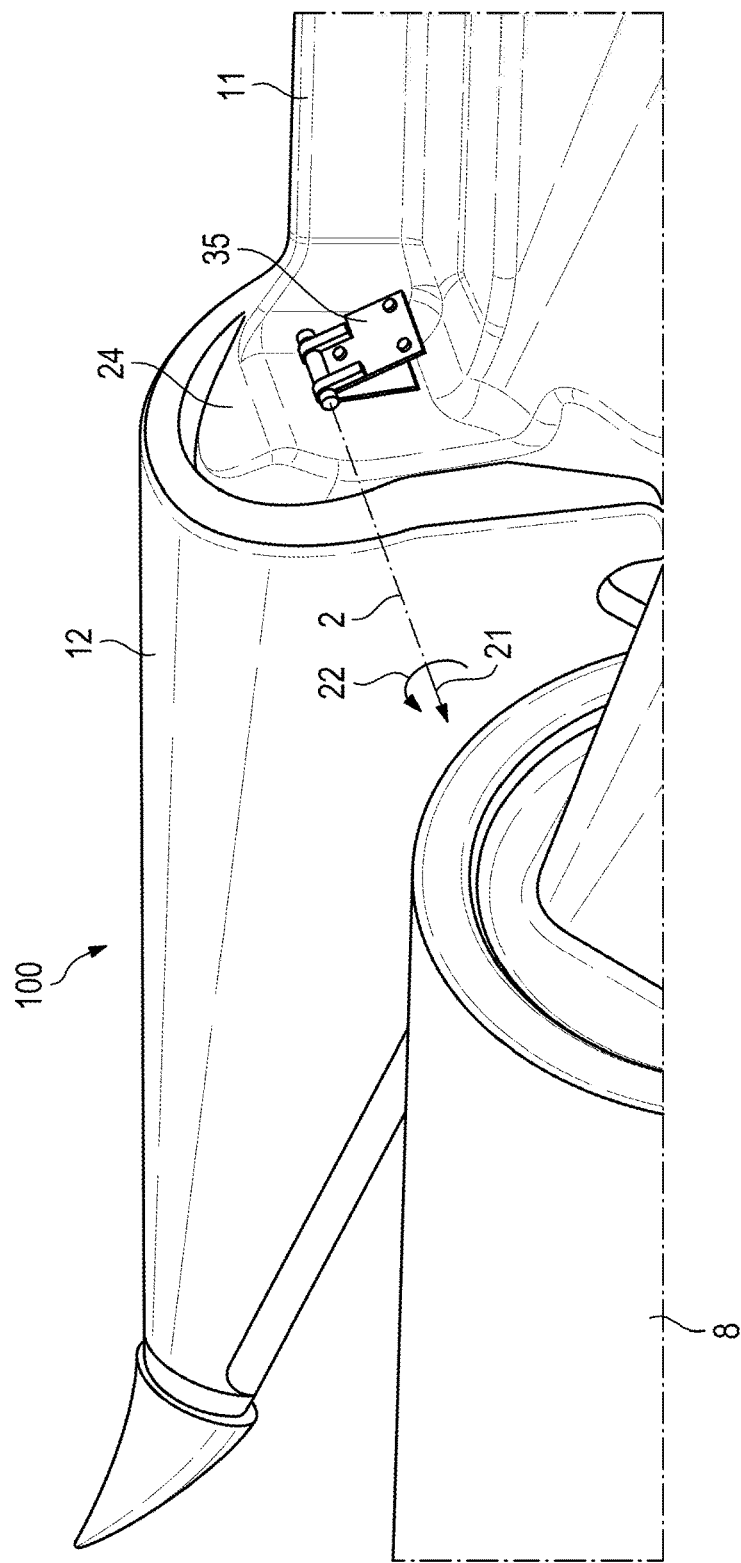

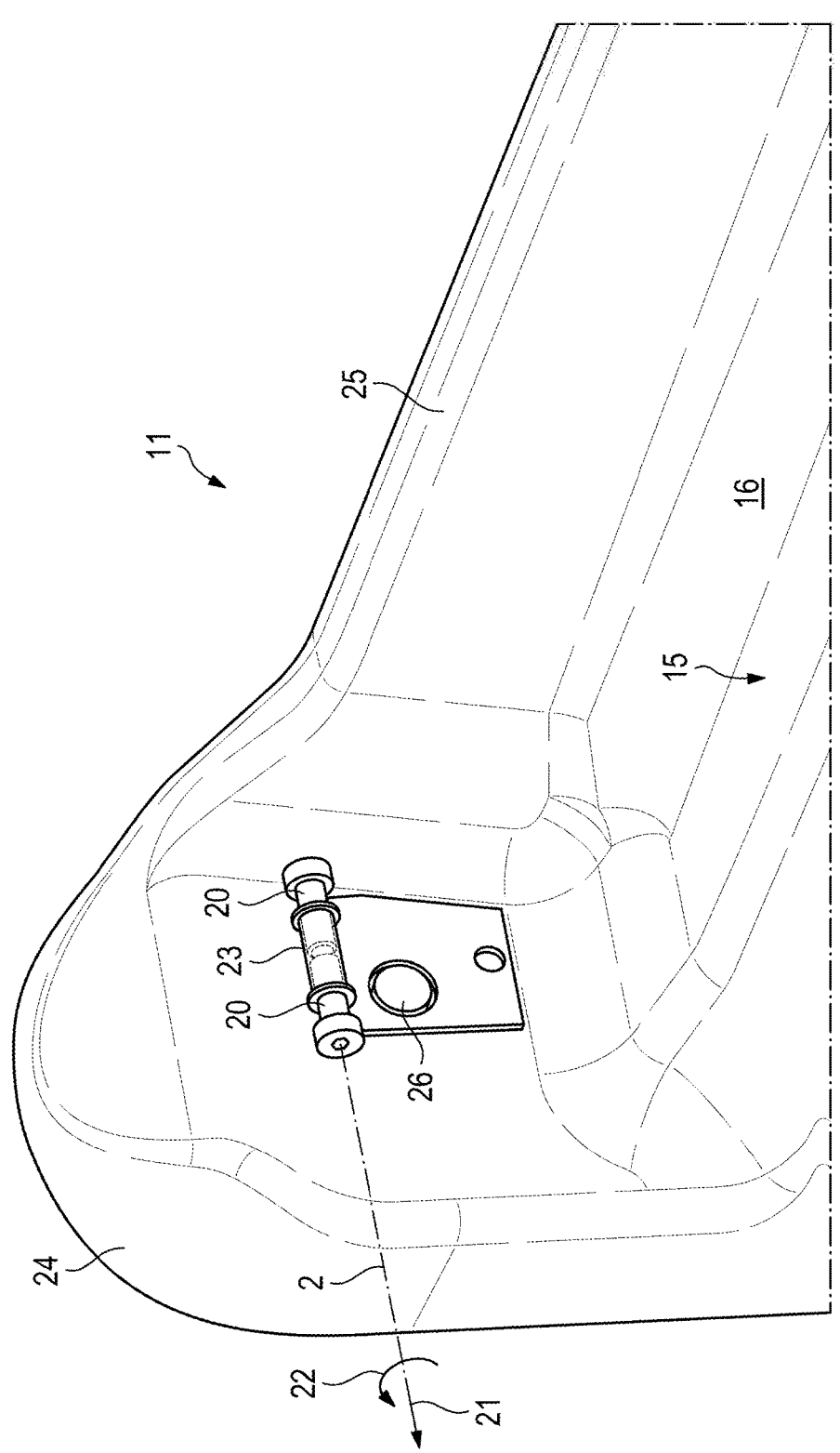

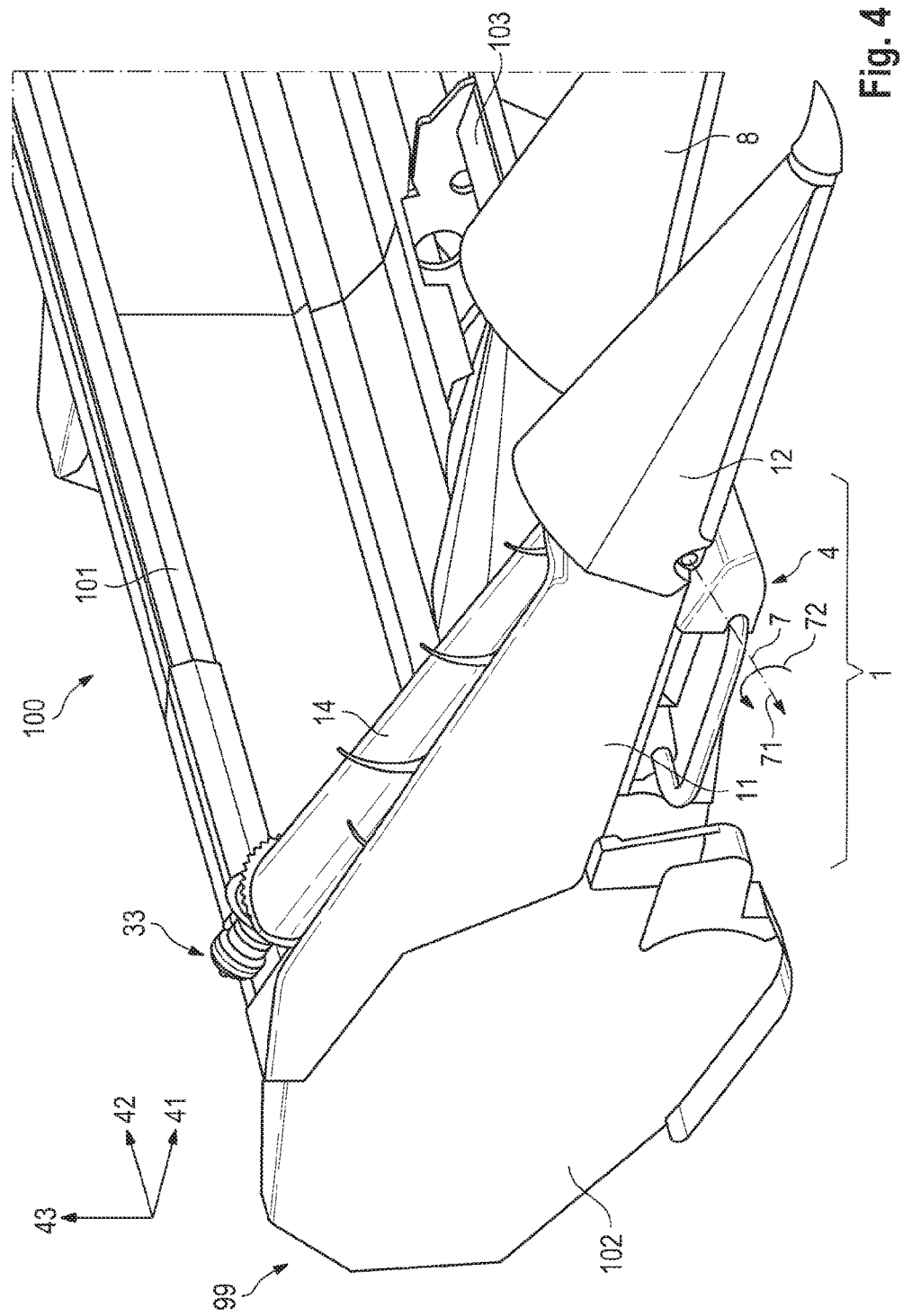

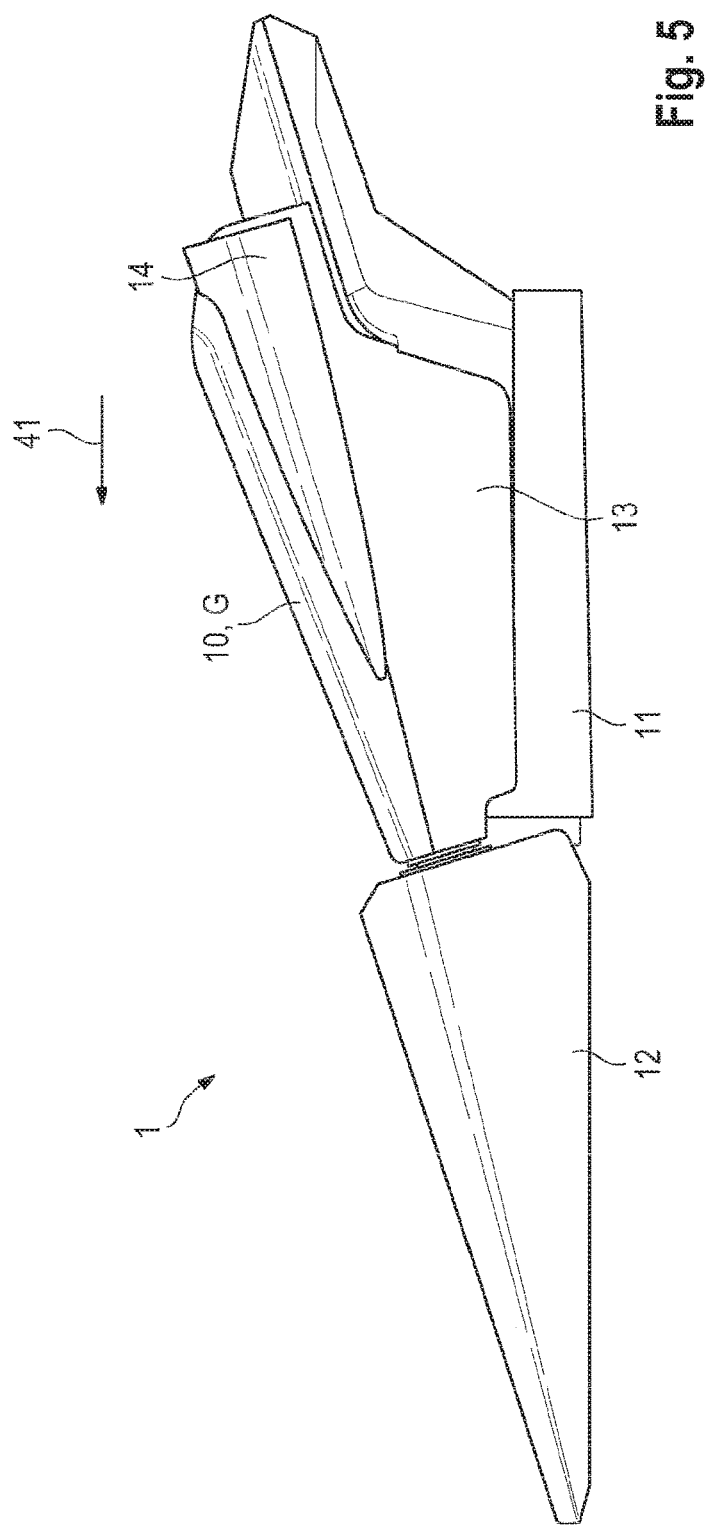

ATTACHMENT FOR HARVESTING ROW CROPS

BACKGROUND

Attachments may be bunt onto agricultural machines, and serve to harvest crops on the field. Row crops, like corn or sunflowers, may be harvested with corn picker- or corn header-type attachments. Corn pickers are used to pick bulky components, such as corncobs or sunflower heads, from the stem and relay them to a combine harvester. The stems and leaves remain on the field. By contrast, the entire plant is harvested and relayed to a forage harvester in the case of a corn header.

During a harvest, such attachments extend in a direction of extension transverse to the traveling direction, and their outer ends in a direction of extension each exhibit an outer stalk divider. Often situated on the outer stalk dividers is a transverse auger conveyor, which is provided for lifting lying stalks and improving the accommodation of bulky components from such stalks. In publication DE 103 17 469 A1 the stem lifting augers are each vertically adjustably situated on their outer stalk divider, wherein a respective lateral wall is situated below the stem lifting augers.

Also known are attachments with outer stalk dividers on which plates can be or are fastened, or into which the plates are vertically adjustably recessed. Given a high crop yield, the fastened or installed plates prevent the loss of crop fruits hanging over an outer stalk divider.

Publication US 2005/0126151 A1 discloses an attachment with outer stalk dividers that instead of plates exhibits holding arms allocated to the outer stalk dividers, which can be swiveled from a base position around an essentially upwardly directed axis into a forwardly directed position. In the forwardly directed position, the holding arms extend above the outer stalk dividers. A preferably flexibly designed laminar material, e.g., made out of plastic, is situated on the holding arms, preventing the passage of crops between the stalk dividers and holding arms, and thereby a loss of bulky components, such as ears of corn.

SUMMARY

The present disclosure relates to an embodiment of an outer stalk divider for an attachment for harvesting row crop, in particular for a corn picker or corn header, with a base body that extends in a traveling direction and exhibits an upper side, and with a hood that is situated on a front end of the base body as viewed in the traveling direction and tapers in the traveling direction. The present disclosure also relates to a cover element for the outer stalk divider, as well as to an attachment with the outer stalk divider.

In one embodiment, the attachment for harvesting crop rows that exhibits outer stalk dividers may be easily and quickly adjusted to different harvesting conditions and various crops, and allows the least possible loss of bulk components, such as ears of corn, in particular given changing harvesting conditions on the field.

In one embodiment, a stalk divider is created for an attachment for harvesting crop rows. For example, such an attachment is a corn picker or a corn header.

The outer stalk divider includes a base body fender that extends in a traveling direction. A side of the base body facing away from the ground includes a surface that extends in the traveling direction.

The outer stalk divider also exhibits a point, which in the traveling direction is situated at the front on the base body. The point tapers in the traveling direction. In particular for maintenance purposes, it can preferably be turned around an axis in a rotational direction. This makes the assemblies of the attachment provided for collecting and processing the crop better accessible.

The outer stalk divider encompasses a cover element which, in the traveling direction, is situated behind the point and on the upper side. The cover element extends on the upper side at least partially along the surface of the base body, and is at least partially arched in design on an outer surface facing away from the surface.

Due to the arched shape, the stalks of the crop slide along the outer surface, and are not kinked by sharp edges. The cover element thereby allows stalks of the crop hanging over the outer stalk divider to be gently untangled and/or lifted during the harvesting operation. It has been found that fewer bulky components, e.g., ears of corn, are lost on the outer stalk dividers as a result.

For this purpose, the cross section of the outer surface is preferably round, oval or roughly U-shaped (inverted) in design. Given a U-shaped design, it is further preferred that the outer surface exhibit two opposing lateral surfaces and a connecting surface that joins the latter together. Each at least one transition between the lateral surfaces and connecting surface is preferably arched, in particular circular or oval, in design. The cover element then exhibits no edges that might cause the stalks to kink.

In a direction of extension that extends transverse to the traveling direction, the cover element preferably further exhibits a width that is roughly equal to or greater than a width of the surface of the base body. In any event, the width of the cover element is preferably not significantly narrower than that of the surface. The width of the cover element also prevents the stalks from kinking. In addition, this allows less dirt and crop to penetrate into the base body.

A gentle lifting of stalks is preferably also enabled by having the surface of the base body rise in a vertical direction at least partially as it runs opposite the traveling direction, and by having the cover element essentially follow this path. In a base position, the cover element preferably at least partially abuts against the base body.

In one embodiment, the cover element can be reversibly height-adjusted in the vertical direction from the base position into a lifted position. To this end, the cover element is designed so that it can be swiveled around a swiveling axis extending in the direction of extension and/or displaced in the vertical direction. This makes it possible to adjust the outer stalk divider to crops with higher lying positional ears of corn, or other bulky components.

The cover element may be automatically lifted, in particular by means of a hydraulic, pneumatic or electrical actuator. Additionally or alternatively, a manual lifting of the cover element is contemplated and may be provided. In one embodiment, the cover element may be latched in the lifted position, or may be preferably held in the lifted position by a holding force, in particular by a spring or gas pressure spring. One advantage to the embodiment in which the cover element is held in the lifted position by the holding force is that the cover element is automatically deflected given an excessive load, e.g., owing to resting crop. Another advantage to being held by a restoring force exerted in particular by a spring is that the cover element is automatically repositioned when an overload is no longer present.

In order to prevent crop, in particular fruit ears of corn, from falling through a gap between the cover element situated in the lifted position and the base body, the cover element may include a loss preventer, which closes the gap in the lifted state. In one embodiment, the loss preventer is a flexible web, in particular a film made out of plastic, a cloth made out of fabric, or a canvas made out of a combination thereof. In this embodiment, the loss preventer is preferably located on an interior side of the cover element facing the base body. In another embodiment, the loss preventer is designed as a plate in particular fabricated as a single piece with the cover element. The plate is preferably arranged on the interior side, or it also preferably comprises a lateral surface of the cover element. It is especially preferred that the plate extend opposite the vertical direction.

In one embodiment, the interior surface of the cover element and/or the upper surface of the base body border an interior space. In this embodiment, the flexible web can be folded and situated in the base position in the interior space. Alternatively, a roll for rolling up the flexible web can be situated in the interior space or base body.

In another embodiment, the base body includes a gap-shaped receptacle for accommodating the plate in the base position. A plate designed as a lateral wall of the cover element can also be situated to the side of the base body in the base position.

In one embodiment, the cover element is reversibly detachable from the base body. Preferably, the loss preventer may simultaneously be detached from the base body. With the cover element removed, a stalk or down corn auger lifting auger can be arranged on the base body.

However, an embodiment of the outer stalk divider in which a stalk lifting auger is or can be arranged in the interior space is also contemplated. In order to utilize the stalk lifting auger in this embodiment, only the cover element need be removed from the working area, in particular detached from the base body.

The outer stalk divider provides a flexible adjustment to different crops and different harvesting conditions. In addition, it can be adjusted very quickly and easily.

The cover element is preferably detachably fastened to the base body of the outer stalk divider, and can thus be changed out.

In one embodiment, an attachment for harvesting crop rows includes two such outer stalk dividers. The outer stalk dividers are situated at the outer ends of the attachment viewed in the direction of extension. They are preferably located on the attachment so that they cannot be displaced in or opposite the direction of extension. It is here further preferred that inner stalk dividers of the attachment situated between the outer stalk dividers can be displaced in and opposite the direction of extension, so that the attachment can be adjusted to different distances between the crop rows.

BRIEF DESCRIPTION OF THE DRAWINGS

The embodiments will be explained below based on figures. The figures are only exemplary, and do not limit the general inventive idea. Shown in:

FIG. 1A is a perspective view of a respective cutout from a partially assembled attachment with an outer stalk divider, wherein a cover element of the outer stalk divider is situated in a base position;

FIG. 3A is a cutout from the outer stalk divider on FIG. 2A without the cover element;

FIG. 3B is a cutout from the base body of the outer stalk divider on FIG. 2A;

FIG. 4 is a perspective view of a cutout from the partially assembled attachment on FIG. 1A with the outer stalk divider, wherein a stalk lifting auger is here located on the base body instead of the cover element; and FIG. 5 is a schematic view of another embodiment of an outer stalk divider, in which a stem stalk lifting auger is situated below the cover element.

DETAILED DESCRIPTION

Figure 1B:
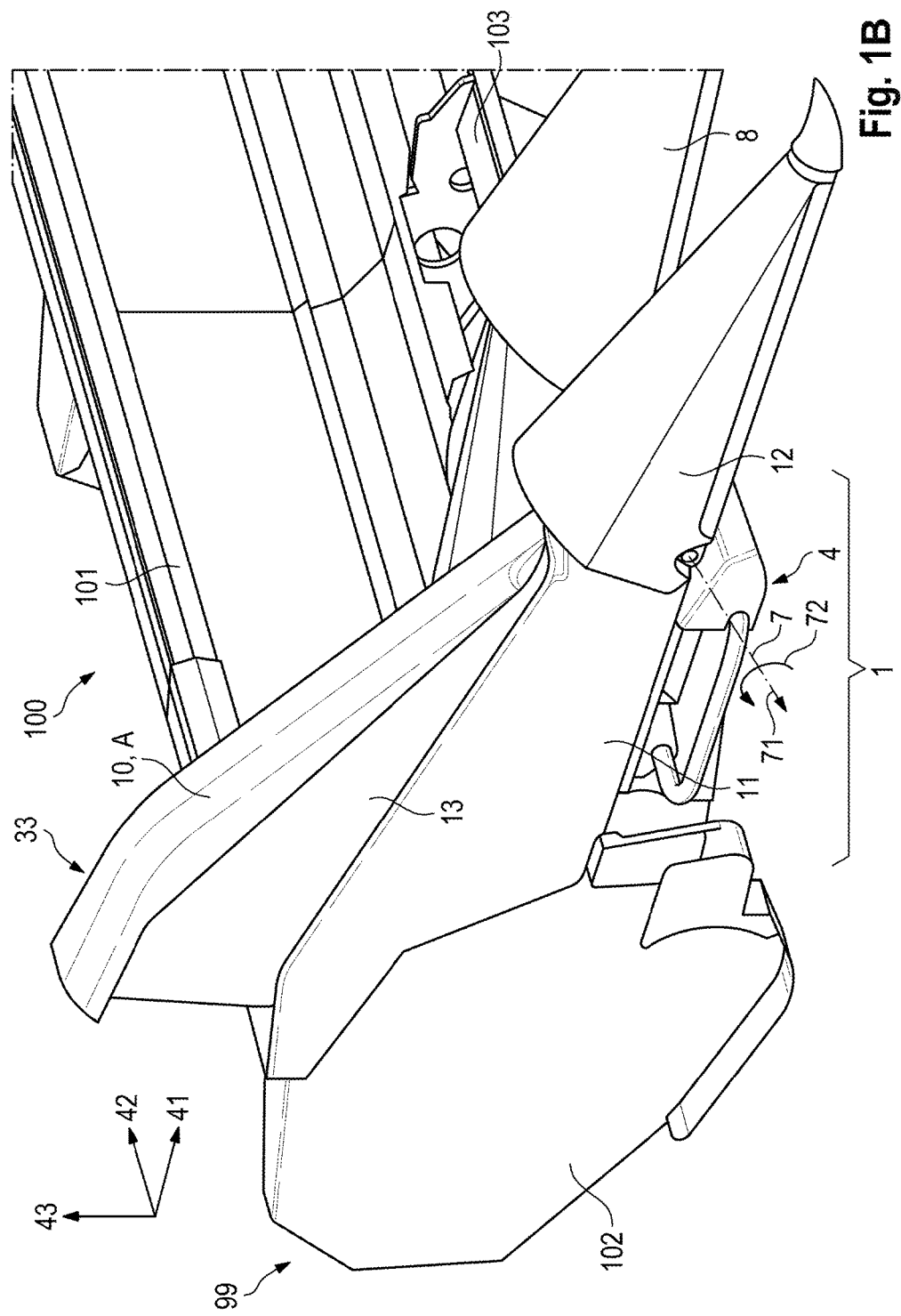
FIG. 1B is a perspective view of a respective cutout from a partially assembled attachment with an outer stalk divider, wherein a cover element of the outer stalk divider is situated in a lifted position.

Shown in FIG. 1A and B in a perspective view is a respective cutout from a partially assembled attachment 100 for harvesting crop rows (not depicted) with an outer stalk divider 1. Such an attachment 100 is mounted to a self-driving agricultural machine (not depicted), for example a combine harvester, a forage harvester or a tractor, for harvesting the crop.

The attachment 100 is here a corn picker type. The terms attachment 100 and corn picker are therefore used synonymously below.

The attachment 100 exhibits a frame that encompasses two lateral walls 102 spaced apart from each other, which are joined together by means of a rear wall 101 and/or at least one cross beam 103. The rear wall 101 and/or cross beam 103 extend in a direction of extension 42 transverse to a traveling direction 41, in which the attachment 100 is moved during a harvesting operation. The two lateral walls 102 are each located at the outer ends 99 of the attachment 100 as viewed in the direction of extension 42.

A respective outer stalk divider 1 is here arranged on both lateral walls 102 and roughly flush with the rear wall 101. The outer stalk dividers 1 in one embodiment are not displaceable in and opposite the direction of extension 42. However, in other embodiments, the attachments 100 may have outer stalk dividers 1 that can be displaced in and opposite the direction of extension 42.

Provided between the outer stalk dividers 1 are a plurality (more than one) of inner stalk dividers 8, of which only a single one is here depicted. The inner stalk dividers 8 here provided may be displaced in and opposite the direction of extension 42, in particular along the cross beam 103, so that the attachment 100 can be adjusted to different distances between the crop rows. However, in other embodiments, the attachments 100 may have inner stalk dividers 8 that cannot be displaced in and opposite the direction of extension 42.

The outer stalk dividers 1 of the attachment 100 each exhibit a base body 11, which extends in the traveling direction 41, and a hood 12. The hood 12 is situated on the base body 11 at the front in the traveling direction 41. It tapers in the traveling direction 41. In the embodiment shown here, the hood 12 may, for maintenance purposes, be folded or rotated in and against a radial folding direction 72 around a folding axis 7 extending in an axial folding direction 71 parallel to the direction of extension 42.

The outer stalk divider 1 also includes a cover element 10. In the traveling direction 41, the cover element 10 is located behind the hood 12 and on an upper side 33 of the outer stalk divider 1. The upper side 33 of the base body 11 exhibits a surface 15 extending in the traveling direction 41 (see FIG. 2A, 3A). The cover element 10 can be reversibly vertically adjusted, through translation and/or rotation, from a base position G into a lifted position A in a vertical direction 43 extending transverse to the traveling direction 41 and transverse to the direction of extension 42. This makes it possible to adjust the outer stalk divider 1 to crops with higher lying fruit.

FIG. 1A shows the cover element 10 in the base position G, in which it extends at least partially along the surface 15 of the base body 11.

As evident, the cover element 10 abuts against the base body 11 in the base position G. In addition, the surface 15 of the base body 11 runs at least partially against the traveling direction 41, rising in the vertical direction 43. This enables a gentle lifting of the crop stems during the harvesting operation.

FIG. 1B shows the cover element 10 in the lifted position A, in which it is swiveled, or pivoted, in a radial swiveling direction 22 around a swiveling axis 2 (see FIG. 3B) extending in an axial swiveling direction 21 parallel to the direction of extension 42.

As evident, a loss preventer 13 is arranged on the cover element 10, and closes a gap 3 (see FIG. 2B) between the cover element 10 and base body 11, so as to avoid losses in fruit owing to fruit that falls through the gap 3 during the harvesting operation.

Figure 2A:
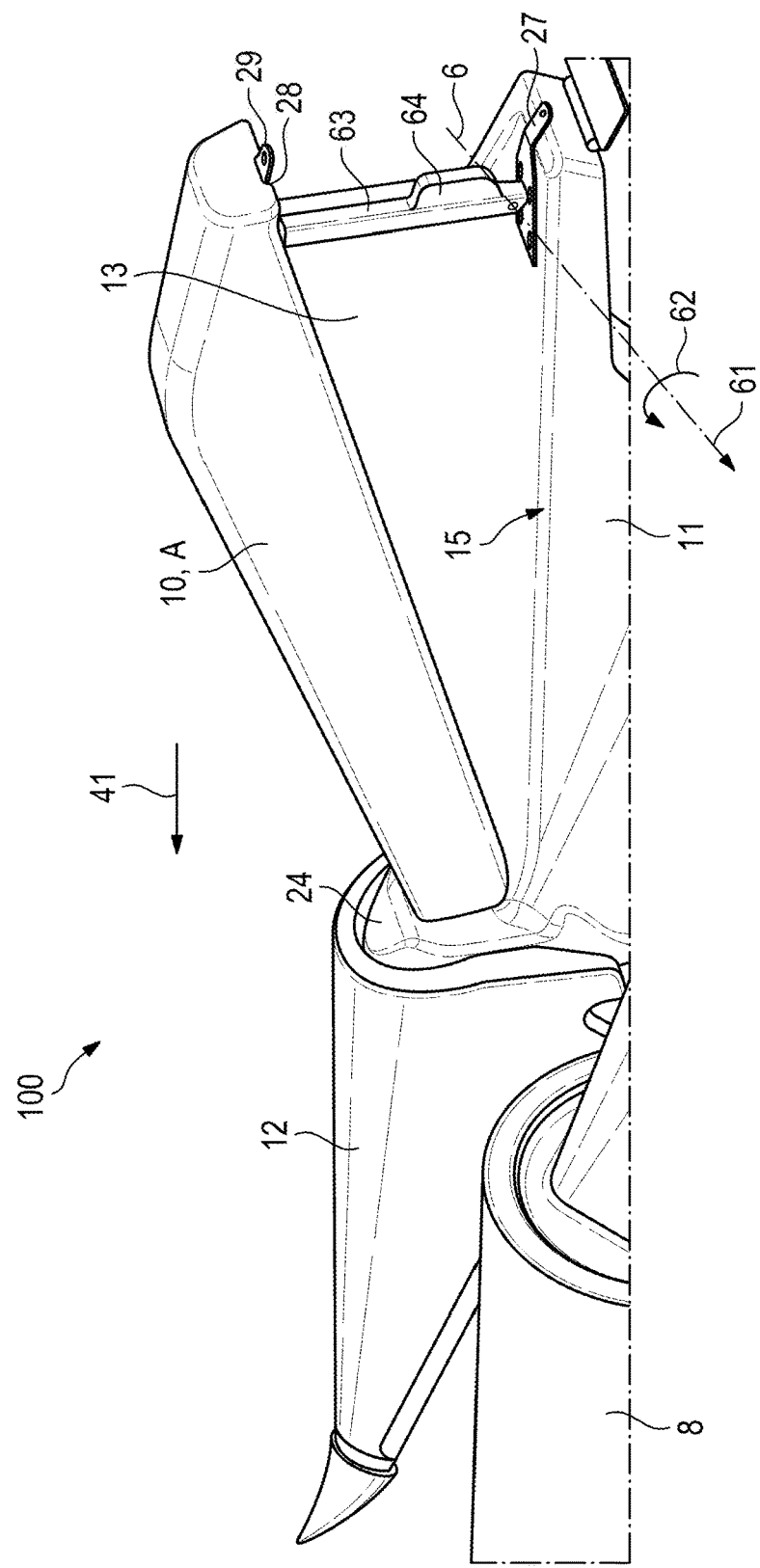
FIG. 2A is another perspective view of another embodiment of an attachment with an outer stalk divider with a cover element situated in the lifted position.

FIG. 2A shows another perspective view of another embodiment of an attachment 100 with an outer stalk divider 1 with a cover element 10 in the lifted position A.

Also provided in this embodiment is a loss preventer 13, which closes the gap 3 between the cover element 10 and base body 11. The loss preventer 13 is here made out of a flexible web, for example a canvas, which may be made of cloth, film or rubber like materials. Therefore, the terms loss preventer 13 and canvas are used synonymously within the framework of FIG. 2A.

The surface 15 of the base body 11 and an inner surface 19 facing it (see FIGS. 2B and 3B) of the cover element 10 together border an interior space 16. When lowering the cover element 10 opposite the swiveling direction 22, the loss preventer 13 automatically folds, so that it is situated in the interior space 16 in the base position G of the cover element 10.

The cover element 10 in this embodiment is fixed in the lifted position A by means of a manually actuatable lever 63 as shown in FIG. 2A. The lever 63 exhibits a handhold in the form of a handle 64, making it easy to actuate.

In order to fasten the lever 63, the base body 11 has arranged on it a first fastening component 27, on which the lever 63 is fastened so that it can turn around a rotational axis 6 extending in an axial rotational direction 61 parallel to the direction of extension 62, in and opposite a radial rotational direction 62.

In the base position G, the lever is situated in the interior space 16. The lever 63 then abuts against the surface 15 of the base body 11. In order to fix the cover element 10 in the lifted position A, the lever 63 is turned or pivoted in the radial rotational direction 62 around the rotational axis 6. The cover element 10 has arranged on it a second fastening component 28, on which the lever 63 may be latched.

In one embodiment, the cover element 10 may be automatically lifted, in particular by means of a hydraulic, pneumatic or electrical actuator. For example, the cover element 10 may be latched in the lifted position, or may be preferably held in the lifted position by a holding force, by a biasing device, for example a spring, whether mechanical (compression or tension) or pneumatic (e.g., gas pressure spring). When the cover element 10 is held in the lifted position by the holding force of the spring, the cover element 10 is automatically deflected downwardly given an excessive load, e.g., owing to resting crop. Another advantage to being held by a restoring force exerted in by the spring is that the cover element 10 is automatically repositioned when an overload is no longer present.

Figure 2B:
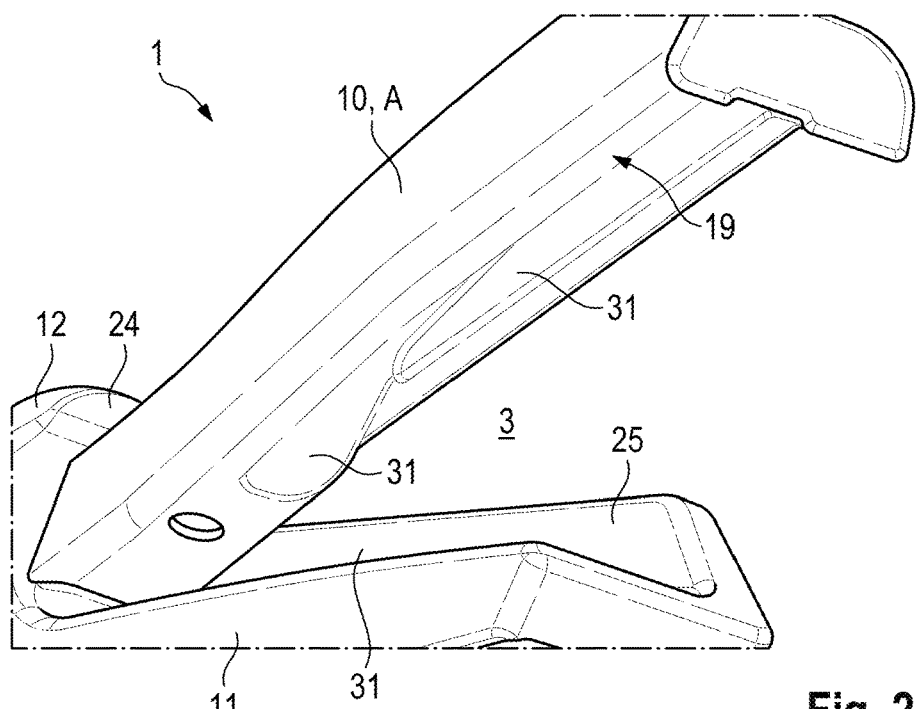
FIG. 2B is a schematic view of an outer stalk divider, which shows another perspective view of a respective cutout from a base body and from the lifted cover element of the outer stalk divider.

FIG. 2B schematically depicts another perspective view of a respective cutout from the base body 11 and from the lifted cover element 10 of the outer stalk divider 1. The loss preventer 13 and fastening components 27, 28 are not shown. This reveals the gap 3 between the cover element 10 in the lifted position A and the base body 11.

Provided on the cover element 10 and base body 11 are fastening webs, on which the loss preventer 13 can be fastened. Lateral walls 25 are here used for the fastening webs 31 on both the base body 11 and the cover element 10.

Figure 2C:
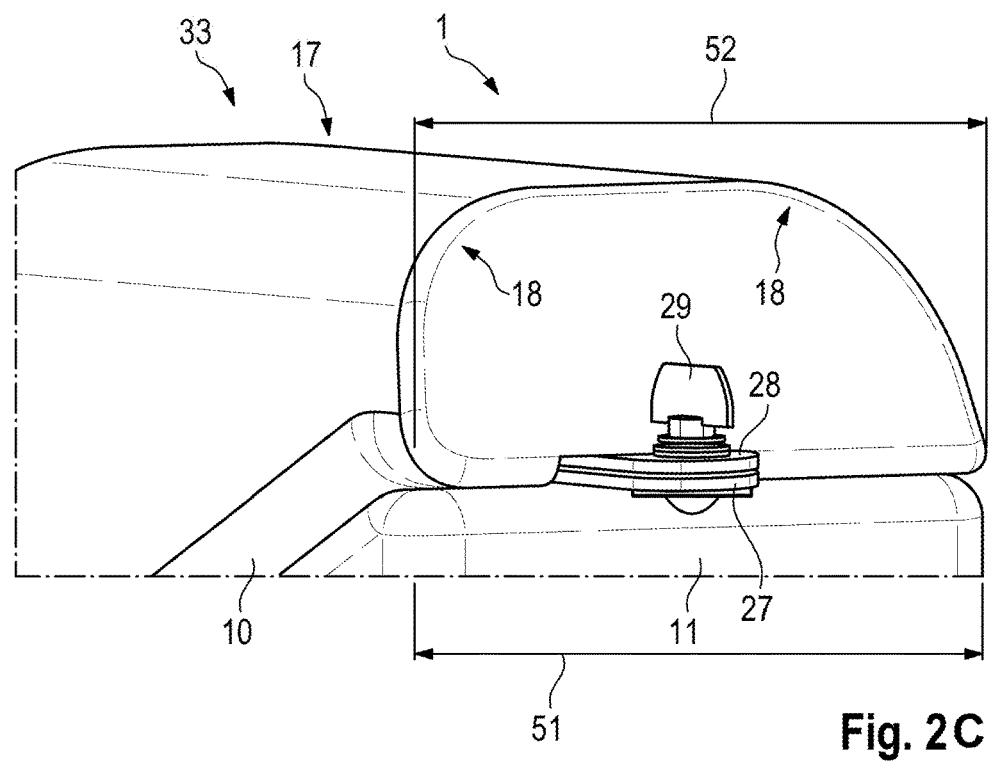
FIG. 2C is a magnified cutout of the outer stalk divider on FIG. 2A with a cover element in the base position.

FIG. 2C shows a magnified cutout of the outer stalk divider on FIG. 2A, wherein the cover element 10 is located in the base position.

In order to fix the cover element 10 in the base position G on the base body, the first and second fastening components 27, 28 here each exhibit a tab (not marked), which are joined together by means of a fastening screw 29.

The upper side 33 of the cover element 10 exhibits an outer surface 17. The outer surface 17 is situated so as to face away from the surface 15 of the base body 11. It is at least partially arched in design.

In one embodiment, the outer surface 17 of the cover element 10 is here roughly U-shaped (inverted) in design. For this reason, the outer surface exhibits two opposing lateral surfaces 34 and a connecting surface 32 that joins the latter together. The respective transitions 18 between the lateral surfaces 34 and connecting surface 32 are here arched, in particular circular, in design. As a result, the cover element 10 exhibits no edges that might cause the stalks to kink. The stalks then slide along the outer surface 17. This enables a gentle untangling and/or lifting of the stalks of the crop hanging over the outer stalk divider 1 during the harvesting operation, and fewer bulky components are lost on the outer stalk dividers 1.

Also shown in FIG. 2C is that the cover element 10 exhibits a width 52 in the direction of extension 42 that is roughly equal to a width 51 of the surface 15 of the base body 11. This also prevents the stalks from kinking. In addition, less dirt and crop can thereby penetrate into the base body 11, in particular into the interior space 16.

FIG. 3A shows a cutout from the outer stalk divider 1 on FIG. 2A without the cover element 10. This reveals a hinge part 35 to which the cover element 10 can be mounted. The hinge part 35 is situated so that it can turn around bolts 20 (FIG. 3B), which extend in the axial swiveling direction 21 around the swiveling (pivot) axis 2. When the cover element 10 is arranged on the hinge part 35, it can thus be swiveled or pivoted from the base position G in the radial swiveling direction 22 around the swiveling axis 22 into the lifted position A and back again.

FIG. 3B also shows a cutout of the base body 11 of the outer stalk divider 1 on FIG. 2A. The hinge part 35 has here been removed. In order to remove the hinge part 35, the bolts 20 are detachably secured to each other by means of a sleeve 23. In this embodiment, the cover element 10 can be detached from the base body 11, such that it is removeably coupled to the base body.

When the cover element 10 is removed, a stalk lifting auger 14 can be situated on the base body 11. For this reason, a receptacle 26, in particular a gear arrangement, is provided below the bolts 20 for the stalk lifting auger 14, into which the latter can be inserted or to which the latter can be operably connected. The receptacle 26 is arranged in a front wall 24 of the base body 11.

FIG. 4 shows a perspective view of a cutout from a partially assembled attachment 100 on FIG. 1 with the outer stalk divider 1. The stalk lifting auger 14 is located on the base body 11 in place of the cover element 10.

FIG. 5 schematically depicts another embodiment of an outer stalk divider 1. In this outer stalk divider 1, the stalk lifting auger 14 is situated below the cover element 10. As evident, the cover element 10 does not completely cover the stalk lifting auger 14. Also preferred, however, is an embodiment in which the stalk lifting auger 14 is completely incorporated in the interior space 16 in the base position G.

In order to utilize the stalk lifting auger 14 in this embodiment of the outer stalk divider 1, the cover element 10 can be detached from the outer stalk divider 1.

Additionally situated on the cover element 10 in place of a flexibly designed loss preventer is a plate 13, which together therewith can be moved from the base position G into the lifted position A. Within the framework of this embodiment, the terms plate and loss preventer 13 are thus used synonymously. In the base position G shown here, the plate 13 is situated to the side of the base body 11. In one embodiment the plate may be arranged in a gap-shaped receptacle (not shown) of the base body 11 in the base position G.

The cover element 10 may be easily and quickly moved by the user from the base position G into the lifted position, in particular without additional tools, which positioning reduces fruit losses during the harvest. In addition, the cover element may be quickly dismantled, so as to be replaced by a stalk lifting auger 14. Further, the device is easy to clean.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

REFERENCE LIST

1 Outer stalk divider Prefer: Ear Divider" or Ear Stalk Divider
10 Cover element "TOP CAP" or "Cover ist ok
11 Base body Prefer: "Fender"
12 Hood Prefer: "Point"
13 Laminar material, film or cloth or plate
14 Stem lifting auger Prefer: "Down corn Auger" or "Stalking lifting Auger"
15 Surface of base body
16 Interior space
17 Outer surface of cover element
18 Transition between a lateral surface and connecting surface
19 Inner surface of cover element
2 Swiveling axis around which cover element can be swiveled
20 Bolt
21 Axial swiveling direction
22 Radial swiveling direction
23 Sleeve
24 Front wall
25 Lateral wall
26 Stem lifting auger receptacle
27 First fastening component on base body
28 Second fastening component on cover element
29 Fastening screw
3 Gap
31 Fastening web
32 Connecting surface
33 Upper side
34 Lateral surface
4 Front end of base body in traveling direction
41 Traveling direction
42 Direction of extension
43 Vertical direction
51 Width of base body
52 Width of cover element
6 Rotational axis
61 Axial rotational direction
62 Radial rotational direction
63 Fixing lever
64 Handhold, handle
7 Folding axis
71 Axial folding direction
72 Radial folding direction
8 Inner stalk divider or "Center stalk Divider"
99 Outer end of attachment
100 Attachment, corn picker
101 Rear wall
102 Lateral wall
103 Cross beam
G Base position
A Lifted position

The invention claimed is:

1. An outer stalk divider for an attachment for harvesting row crop, the outer stalk divider comprising:
a base body that extends in a traveling direction and comprises a surface that extends in the traveling direction on an upper side, and a hood, which is situated at a front on the base body as viewed in the traveling direction, and which tapers in the traveling direction; and
a cover element which, in the traveling direction, is situated behind the hood and on the upper side, wherein the cover element extends at least partially along the surface of the base body, and comprises at least a partially arched outer surface facing away from the surface of the base body;
wherein the cover element and the hood are each configured to move relative to the base body to at least two positions; and
wherein the cover element and the hood are moveable relative to the base body independent of one another.

2. The outer stalk divider according to claim 1 wherein, in a direction of extension that extends transverse to the traveling direction, the cover element exhibits a width that is equal to or greater than a width of the surface of the base body.

3. The outer stalk divider according to claim 1 wherein the surface of the base body rises in a vertical direction at least partially as viewed opposite the traveling direction, and wherein the cover element follows the path of the base body.

4. The outer stalk divider according to claim 1 wherein the cover element is reversibly height-adjustable in a vertical direction from a base position (G) into a lifted position (A).

5. The outer stalk divider according to claim 4 further comprising a latch device securing the cover element in the lifted position (A) or base position (G).

6. The outer stalk divider according to claim 4 further comprising a holding force holding the cover element in the lifted position (A).

7. The outer stalk divider according to claim 4 wherein the cover element comprises a loss preventer closing at least a portion of a gap formed between the base body and the cover element in the lifted position (A).

8. The outer stalk divider according to claim 4 wherein an inner surface of the cover element and the surface of the base body define an interior space.

9. The outer stalk divider according to claim 1 wherein the cover element is reversibly detachable from the base body.

10. The outer stalk divider according to claim 8 further comprising a stalk lifting auger disposed in the interior space.

11. An attachment for harvesting crop rows with two outer stalk dividers according to claim 1 wherein the outer stalk dividers are arranged on the outer ends of the attachment viewed in a direction of extension.

12. The attachment according to claim 11, wherein the outer stalk dividers are located on the attachment so that they cannot be displaced in and opposite the direction of extension.

13. The outer stalk divider according to claim 4 further comprising a latch device securing the cover element in the lifted position (A) and base position (G).

14. The outer stalk divider according to claim 1 wherein the hood moves about a first axis of rotation;
wherein the cover element moves about a second axis of rotation; and
wherein the first axis of rotation is different from the second axis of rotation.

15. The outer stalk divider according to claim 14 wherein the hood moves from a lower position to an upper position in a first direction;
wherein the cover element moves from a lower position to an upper position in a second direction; and
wherein the first direction is opposite the second direction.

16. The outer stalk divider according to claim 14 wherein the cover element moves about a hinge on an interior wall of the base body.

17. The outer stalk divider according to claim 16 further comprising a flexible web arranged on the cover element;
wherein, with the cover element in the upper position, the flexible web closes a gap between the cover element and the base body; and
wherein, with the cover element in the lower position, the flexible web folds in an interior space of the base body.

18. The outer stalk divider according to claim 1 further comprising:
a lifting mechanism configured to lift the hood from a base position into a lifted position; and
a locking mechanism configured to lock the hood in at least one of the base position or the lifted position.

19. The outer stalk divider according to claim 18 wherein the lifting mechanism comprises a lever attached at one end to the base body, the lever configured to rotate about a rotational axis.

20. The outer stalk divider according to claim 1 further comprising:
a stalk lifting auger situated on the base body; and
a receptacle an interior wall of the base body, the receptacle configured to receive the stalk lifting auger.

* * * * *